Feb. 6, 1923.
S. G. RIGDON.
COMPOSITION FLOOR STRIP.
FILED MAY 10, 1921.
1,444,274.
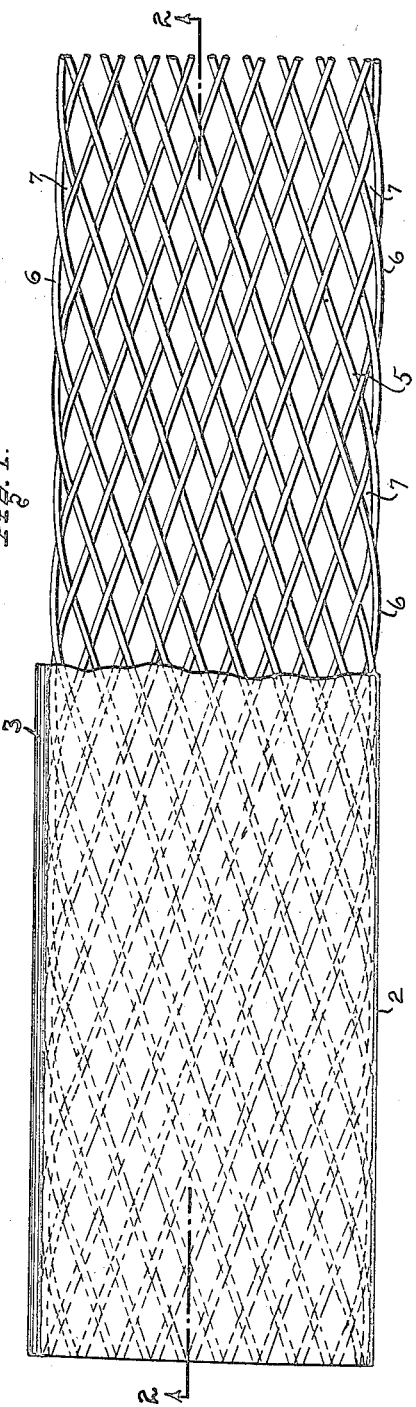
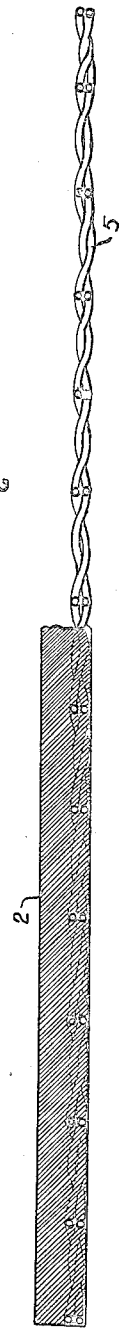
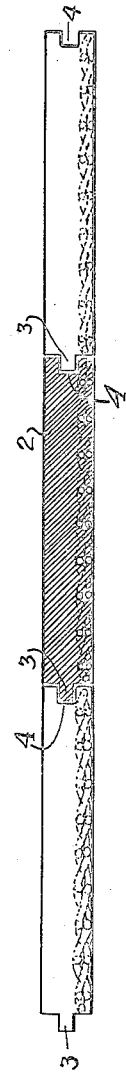
Inventor
S. G. RIGDON.

Patented Feb. 6, 1923.

1,444,274

UNITED STATES PATENT OFFICE.

SAMUEL G. RIGDON, OF AKRON, OHIO.

COMPOSITION FLOOR STRIP.

Application filed May 10, 1921. Serial No. 468,232.

*To all whom it may concern:*

Be it known that I, SAMUEL G. RIGDON, a citizen of the United States, residing at Akron, in the county of Summit and State of Ohio, have invented certain new and useful Improvements in a Composition Floor Strip, of which the following is a specification.

The present invention comprises a floor strip composed of rubber or of rubber and comminuted fibre and reenforced in a particular way to promote its life and durability and to assure a permanent flat surface and also enable relatively long strips to be matched, laid, transported and handled conveniently without injury or breakage. As constructed the floor strip is resilient and has cushioning properties and embodies a woven wire braid within its bottom side which gives the strip rigidity and strength and sufficient flexibility to withstand heavy wear and weights and with spring properties adapted to always return it to its original flat state when the weight or pressure is removed. The formation of the strip is also such that it may be matched with corresponding strips and nailed to the floor in the same way as in ordinary wooden flooring, and the woven wire braid forming the base of the strip permits the use of nails, screws, etc. and assures the attachment of the strip by the nails and also prevents the strip from stretching and buckling or becoming distorted in use and serves to hold the floor strip its entire length flat upon the floor and to keep its shape regardless of differences in temperature where situated, such differences for example as caused by heating pipes laid beneath the floor.

In the accompanying drawing, Fig. 1 is a plan view of a piece of my improved flooring with one end broken away and showing the woven wire braid in full line. Fig. 2 is a longitudinal section on line 2—2, of Fig. 1, and Fig. 3 is a transverse section of a floor strip with end views of two matching strips engaged therewith.

The invention comprises a flat body or strip 2 of any desired width and length having a thickness of approximately three-eighths of an inch and preferably provided at its opposite longitudinal edges with a rabbeted tongue 3 and groove 4 respectively so that corresponding strips may be matched and interlocked with each other. Body 2 is composed of a suitable rubber compound, preferably rubber stock with which comminuted fibre has been thoroughly mixed to produce an exceptionally tough and durable material having flexible and cushioning properties when vulcanized under pressure and heat within a mold adapted to form a solid strip of substantial length. The strips may be made in any length, and a practical width for flooring is two and one-half inches. In mixing the rubber and comminuted fibre together suitable substances, such as red iron oxide, may be used to color the material uniformly throughout its thickness.

The strip is furthermore provided at its bottom side with a woven wire braid 5 which is embedded and incorporated within the composition material during the process of molding and vulcanizing. In making the strip, the woven wire braid may be laid within the bottom of the mold and the plastic material placed upon the braid so that when pressure is brought to bear upon the sectional molds, the plastic material will flow into the open spaces between the cross wires and completely embed the wires within the bottom side of the strip below the horizontal median line of the strip, thereby leaving the major thickness of the strip composed of rubber and fibre so that a substantial wearing and cushioning layer of material is provided in the strip above the plane of the wire braid, and the inlay of wire mesh provides a stiff and stable base possessing flexible spring qualities. The woven wire braid 5 extends the full width and length of the strip, and the longitudinal side edges of the braid are formed by interlacing the wires successively by loops or bends 6 which make the edges of the braid comparatively stiffer than the central or intermediate woven portion of the braid and non-tearable, and the border edges of the braid are round and smooth and without sharp projecting portions or ends, and the interlacing of the wires at the edges provide elongated interstices or spaces 7 through which the nails may be driven in fastening the strip to a wooden base or false flooring.

The floor strips may also be laid in an inverted position, that is to say, the side within which the woven wire braid is incorporated may be laid on top to provide a tread surface composed of both wire and the rubber composition and laying the strips in this manner the more elastic and cushioning body will be interposed between the wire braid and the base. Obviously a double layer of woven wire braid may be incorporated within the strip so that each side of the strip will be faced with woven wire. The wire braid is also distinguished in that the wires cross at acute angles and form elongated diamond spaces between them so that there may be a slightly greater yield transversely than longitudinally in the strip.

What I claim is:

1. A composite flooring strip, comprising comminuted fibers and a rubber compound having a strip of wire mesh fabric incorporated and extending longitudinally therein.

2. A composition floor strip, comprising comminuted fiber and rubber molded and vulcanized and embodying a braid of wire extending longitudinally within the base thereof.

3. A composition floor strip, consisting of comminuted fiber and rubber having a base composed of wire strands extending obliquely in crossing relations longitudinally of said strip.

4. A flooring strip composed of a composition of rubber and fiber having a braid of woven wire with interlaced longitudinal edges incorporated within one side thereof and provided opposite said longitudinal edges with a rabbeted tongue and groove, respectively.

5. A flooring strip comprising vulcanized rubber and a woven wire braid vulcanized together and provided at its opposite longitudinal edges with a tongue and groove, respectively.

Signed at Cleveland, in the county of Cuyahoga, and State of Ohio, this 16th day of March, 1921.

SAMUEL G. RIGDON.